W. GRALAPP.
PORTABLE ELECTRIC AUTOMATIC SAWING MACHINE.
APPLICATION FILED JULY 24, 1914.
1,144,705.
Patented June 29, 1915.
4 SHEETS—SHEET 1.
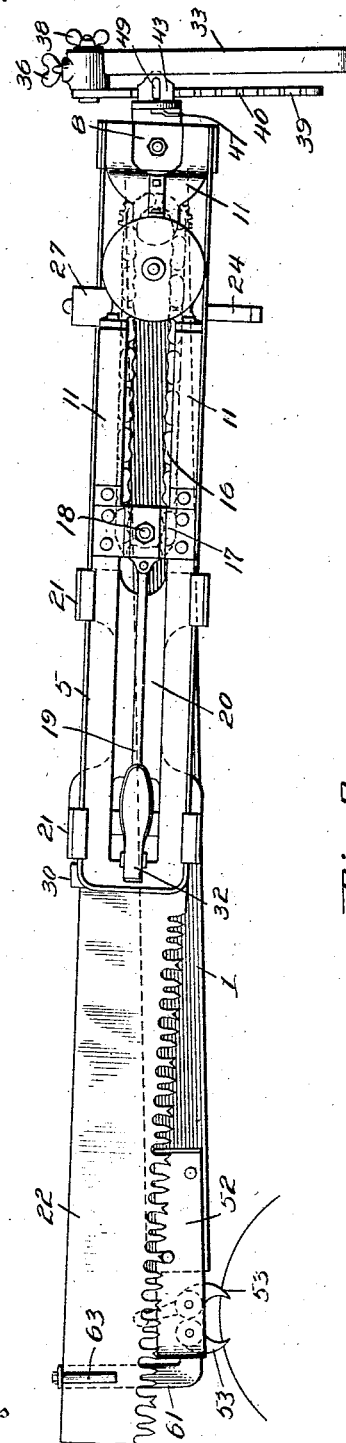
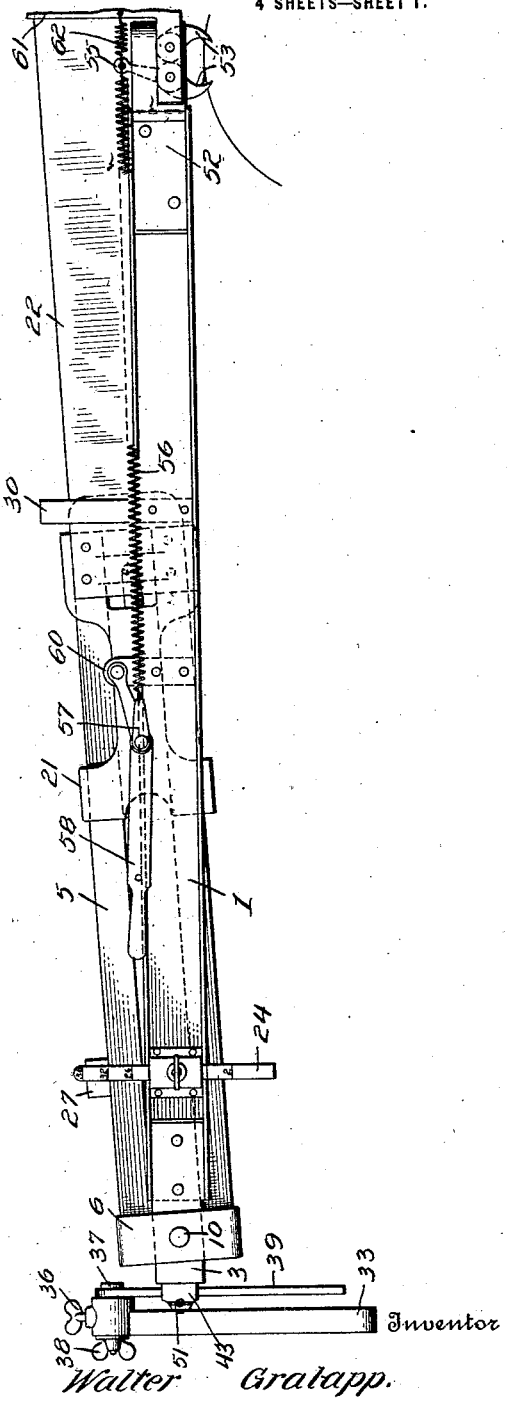
Witnesses
F. C. Gibson.
D. W. Gould
Inventor
Walter Gralapp.
By Victor J. Evans
Attorney

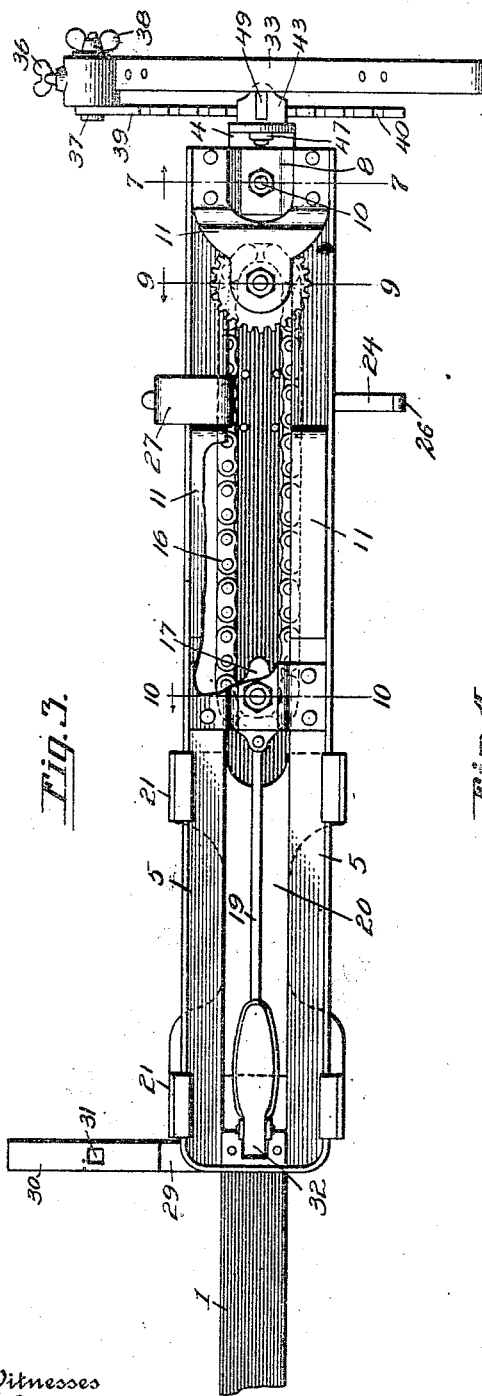
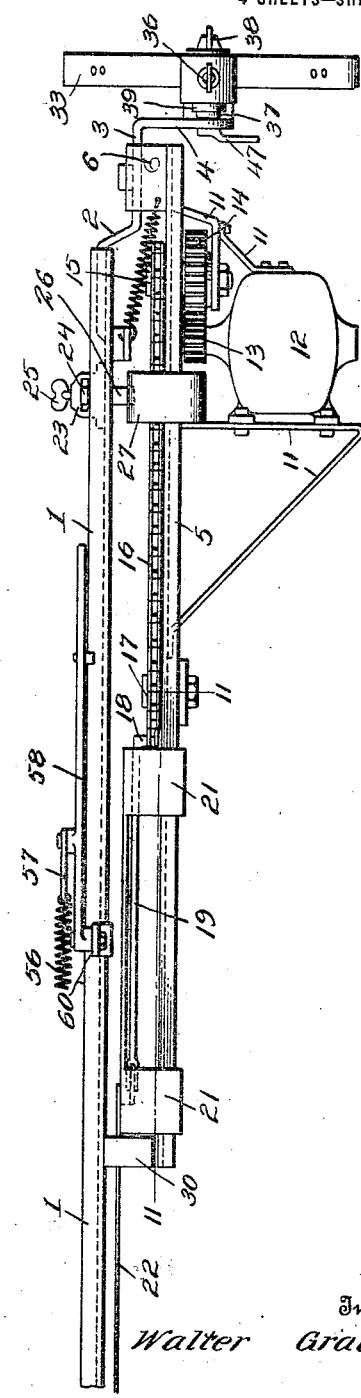

W. GRALAPP.
PORTABLE ELECTRIC AUTOMATIC SAWING MACHINE.
APPLICATION FILED JULY 24, 1914.
1,144,705.
Patented June 29, 1915.
4 SHEETS—SHEET 3.
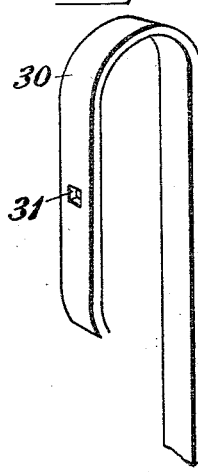
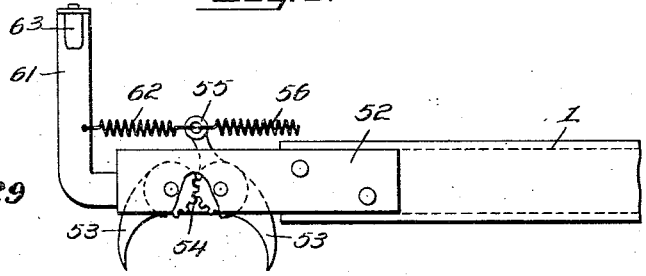
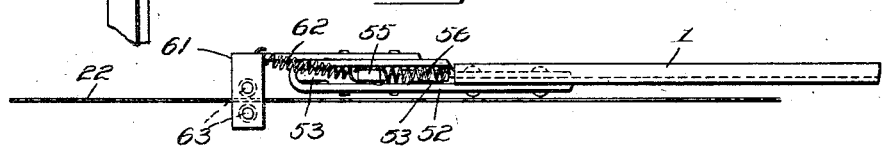
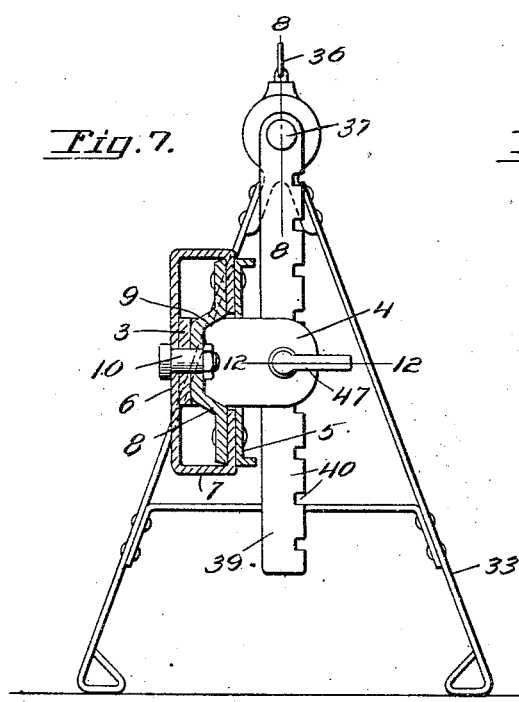
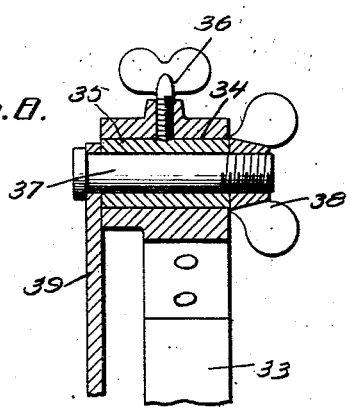
Witnesses
F. C. Gibson
D. W. Gould
Inventor
Walter Gralapp.
By Victor J. Evans
Attorney

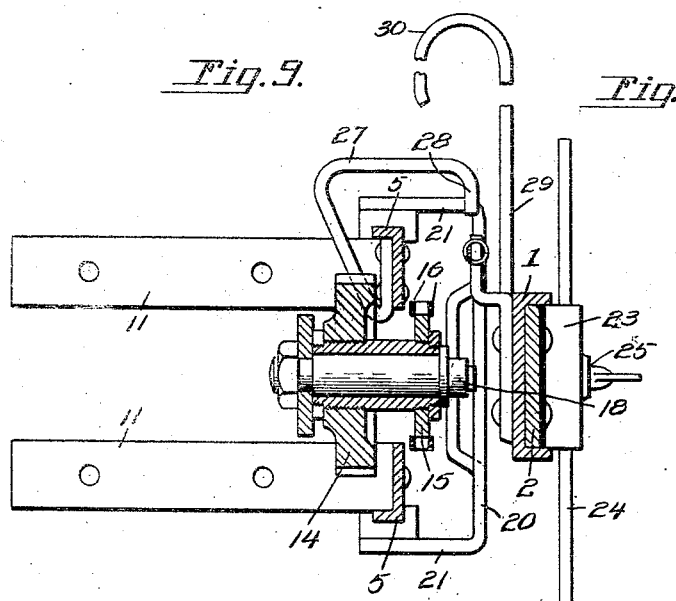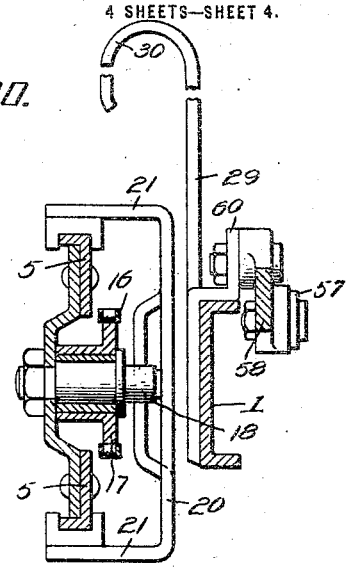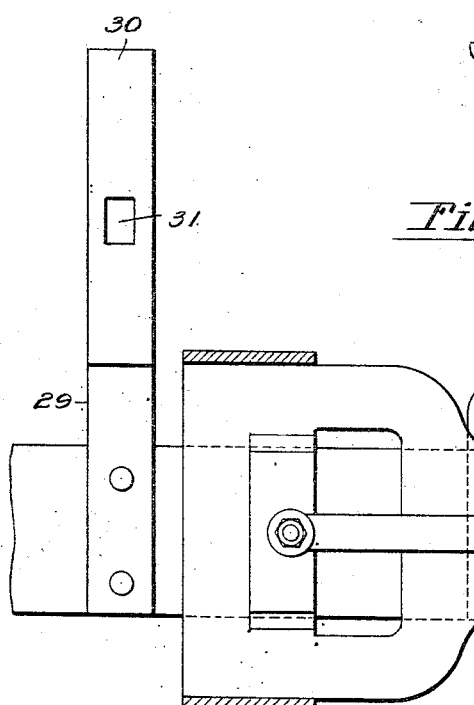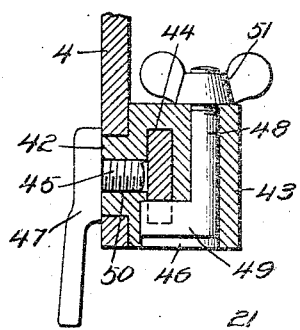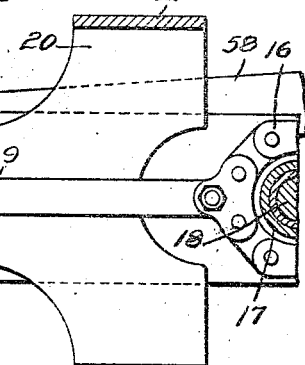

UNITED STATES PATENT OFFICE.

WALTER GRALAPP, OF WITTENBERG, WISCONSIN.

PORTABLE ELECTRIC AUTOMATIC SAWING-MACHINE.

1,144,705.  Specification of Letters Patent.  Patented June 29, 1915.

Application filed July 24, 1914. Serial No. 852,890.

*To all whom it may concern:*

Be it known that I, WALTER GRALAPP, a citizen of the United States, residing at Wittenberg, in the county of Shawano and State of Wisconsin, have invented new and useful Improvements in Portable Electric Automatic Sawing-Machines, of which the following is a specification.

The invention relates to a portable sawing machine designed particularly for log sawing, and constructed with a view to providing for the proper reciprocation of the saw and for the adjustment of the sawing machine in accordance with the conditions.

The main object of the present invention is the provision of a sawing machine involving a frame on which the parts are supported, the saw being reciprocated for the sawing operation, and limited to any desired cutting depth, a log gripping element being provided for securing one end of the frame with respect to the log.

The invention in the preferred form of details will be described in the following specification, reference being had particularly to the accompanying drawings, in which:—

Figure 1 is a view in elevation, showing the improved machine. Fig. 2 is a similar view taken from the opposite side. Fig. 3 is an enlarged side elevation, similar to Fig. 1, with the saw and motor omitted. Fig. 4 is a top plan of the machine. Fig. 5 is an elevation of the detail illustrating the log gripping means. Fig. 6 is a top plan of the same. Fig. 7 is a section on line 7—7 of Fig. 3. Fig. 8 is a section on line 8—8 of Fig. 7. Fig. 9 is a section on line 9—9 of Fig. 3. Fig. 10 is a section on line 10—10 of Fig. 3. Fig. 11 is a section on line 11—11 of Fig. 4. Fig. 12 is an enlarged section on the line 12—12 of Fig. 7. Fig. 13 is a detail view of the holding member.

The present improvement comprises a main frame 1, preferably of channel construction and provided at one end with a plate extension 2 having an intermediate portion 3 extended in parallel relation to, but offset from the plane of the main frame, the plate 2 also having a lateral portion 4 projected at right angles to the plane of the main frame for a purpose which will later appear. The portion 3 of the plate pivotally supports the saw frame 5, which latter is also of channel construction. The saw frame is connected to the plate 2 through the medium of a bracket 6, which bracket comprises an approximately rectangular hollow section 7, and to the outer surface of which the saw frame 5 is bolted or otherwise secured, a tie plate 8 with the central inset portion 9 bridging the opening in the bracket section 7 from the inner side. The inset portion 9 of the tie plate is spaced from the inner surface of the bracket portion 7 a sufficient distance to permit the insertion therebetween of the portion 3 of the plate 2, and a pivot bolt 10 unites the parts at this point, whereby the saw frame 5 is pivotally connected to the plate 2 and by reason of the rigid connection between the latter and the main frame 1, the saw frame will be supported by the main frame and may swing relatively thereto.

Supported in brackets 11 projecting from the saw frame 5 is a motor 12, to which current is supplied in any approved or desired manner. The armature shaft carries pinion 13 arranged to mesh with the gear 14 mounted on the auxiliary shaft supported in one of the brackets 11 and the saw frame, the shaft on the inner side of the frame or that side opposite the motor, being provided with a sprocket 15. A sprocket chain 16 connects the sprocket 15 with the sprocket 17 mounted upon the saw frame in alinement with and some distance from the sprocket 15, and one link pin of the sprocket chain is extended as at 18 to provide for the connection therewith of a pitman rod 19, which rod, by reason of its connection with the chain, is compelled to travel a reciprocatory path in the movement of the chain about the sprockets. A guide frame 20 is slidably mounted upon the saw frame 5, being provided with edge extensions 21 at remote points to slidably impress the respective edges of the saw frame. The pitman 19 is connected to the frame 20 so that the latter reciprocates therewith, being guided by the saw frame previously described. The saw 22 is connected to the frame 20, so as to move in unison with the latter.

Secured upon the main frame 1 is a clamp bracket 23 formed with a vertical opening to receive a limiting member 24, the latter being secured in adjusted position transverse the main frame by a set screw 25. The limiting member has a lateral foot 26 arranged to underlie the saw frame, and the saw-frame is provided with an upwardly extending laterally projecting stop arm 27, the terminal end 28 of which moves in the path to be intercepted by the end of the foot 26 so as to limit the descent of the saw frame. The limiting member 24 is preferably provided with a series of graduations as shown in Fig. 2, whereby to accurately determine the cutting depth of the saw as may be desired. The main frame 1 is further provided with a holding member 29 projecting vertically therefrom approximately in line with the forward end of the saw frame, said member 29 extending above the main frame and having its terminal downwardly curved to provide a spring section 30 in which, at an appropriate point, is formed an opening 31. A spring locking dog 32 is mounted upon the saw frame in position to engage the opening 31. There is thus provided a means whereby when the saw is not desired for immediate use, it may be elevated and through the use of the dog locked in such elevated position until its use is desired.

The main frame is provided with means whereby the rear end thereof is adjustably supported and the forward end disposed for gripping coöperation with the log. In providing the rear support, I arrange an upright 33 adapted to rest upon the surface of the ground and formed at the upper end in the horizontal bearing opening 34 in which is arranged a bushing 35 adapted to be secured by a set screw 36. A bolt 37 extends through the bushing and is adapted to be clamped in fixed relation by a wing nut 38, the head end of the bolt passing through a supporting arm 39. The arm is thus mounted for various adjustments with respect to the upright, as will be obvious from the connection described, and as more particularly illustrated in Fig. 8. The edge of the arm 39 is formed with a series of notches 40 and the main frame is adapted for adjustment longitudinally of the arm to regulate the height of said frame. In providing for such adjustment, the section 4 of the plate 2 is formed with an opening 41 to receive a boss 42 extending from the guide block 43, which block is formed with an opening 44 to slidably receive the arm 39. A locking screw 45 is threaded into an opening 46 in the guide block and provided with an operating handle 47 which overlies and bears upon the section 4 of the plate 2, whereby the block is locked with relation to the plate when desired. A locking key 48 is movable in the block, being formed with a lateral terminal 49 operating in the opening 50 formed in the block and adapted to engage any one of the notches 40 in the arm 39. The end of the key extends beyond the block and is threaded for the reception of the nut 51. By this construction, the frame 1 may be secured in any desired position lengthwise the arm 39, and the latter may be adjusted at any angular relation to the uprights 33.

The opposite end of the main frame 1 is provided with means whereby the sawing machine may be supported from the log or the like, said means being designed to grip or bite into the log. To this end, I provide a main frame with an extension plate 52 on which is pivotally supported a gripping dog 53 having terminal points to take into the log. The pivots of the dogs are formed to provide interengaging pinions 54, whereby dogs are simultaneously operated. One of the dogs is provided with an arm 55 to which is connected an extension coil spring 56. The opposite end of the spring is connected by a link 57 with an angle lever 58, the lever being pivoted at 60 on the upright from the main frame. The angular relation of the lever parts is such that the spring tensions to hold the lever in either set or released position, the movement of the lever into set position drawing upon the spring to cause the dogs to bite into the log, as clearly shown in Fig. 2. The end of the extension 52 is provided with an upright 61 connected by a spring 62 with the arm 55, the spring 62 acting in opposition to the spring 56. The upper end of the upright 61 is provided with guide rollers 63 between which the upper edge of the saw is guided in movement.

From the above description, the operation of the device will be fully and clearly apparent, the various adjustments hereinbefore described permitting a range of utility not ordinarily incident to structures of this type.

It will be understood that the improved sawing machine is primarily designed for horizontal sawing, though it is clearly adaptable for sawing in other positions. By reason of its particular construction, it is unusually serviceable in sawing with the material in vertical position, and furthermore in sawing the tree or log at a point close to the ground surface.

What is claimed is:—

1. A portable sawing machine comprising a main frame, means for securing one end of said main frame to a log, an upright disposed adjacent to the remaining end of said frame and adapted to rest upon the ground and having the upper end thereof formed to provide a horizontal bearing opening, a bushing within said opening, a bolt projecting through said bushing, a vertical supporting arm having the upper end thereof secured to one end of said bolt and depending therefrom, an adjustable connection between said supporting arm and the adjacent end of the frame whereby the elevation of the frame may be varied, and means holding said bolt in said bushing and the saw carrying frame connected to said main frame.

2. A portable sawing machine comprising a main frame, means for securing one end of said main frame to a log, an upright disposed adjacent to the remaining end of said frame and adapted to rest upon the ground and having the upper end thereof formed to provide a horizontal bearing opening, a bushing within said opening, a bolt projecting through said bushing, a vertical supporting arm having the upper end thereof secured to one end of said bolt and depending therefrom, an adjustable connection between said supporting arm and the adjacent end of the frame whereby the elevation of the frame may be varied, means holding said bolt in said bushing and the saw carrying frame connected to said main frame, and means holding said bushing against turning movement in the opening in said upright.

3. A portable sawing machine comprising a main frame, means for securing one end of said main frame to a log, an upright disposed adjacent to the remaining end of said frame and adapted to rest upon the ground and having the upper end thereof formed to provide a horizontal bearing opening, a bushing, a vertical supporting arm having the upper end thereof secured to one end of said bolt and depending therefrom, a plate connected to the adjacent end of said frame and extending outwardly therefrom and having the outer end thereof formed with an opening, a guide block having a boss formed thereon projecting through the opening in said plate, means holding said boss within the opening in said plate, said block being also formed with a vertical opening to slidably receive said vertical arm, and adjustable means for effecting a rigid connection between said block and arm.

4. In a portable sawing machine, a main frame, means on one end of said main frame adapted to grip the work, means supporting the remaining end of said frame, a saw carrying frame pivoted upon said main frame and capable of vertical swinging movement, a stop arm secured to said saw carrying frame and projecting upwardly and laterally therefrom, a clamp bracket secured to said main frame and formed with a vertical opening, a limiting member slidably mounted within said opening, a lateral foot on the lower end of said limiting member disposed in the path of movement of said stop arm and adapted to be engaged thereby to limit the downward movement of the saw carrying frame, and means for holding said limiting member in adjusted position in the slot in said clamp bracket.

In testimony whereof I affix my signature in presence of two witnesses.

WALTER GRALAPP.

Witnesses:
P. C. SCHLYTTER,
W. E. WILSON.